Sept. 27, 1949.  A. J. FOX  2,482,846
GARMENT FASTENER
Filed Oct. 14, 1947  2 Sheets-Sheet 1
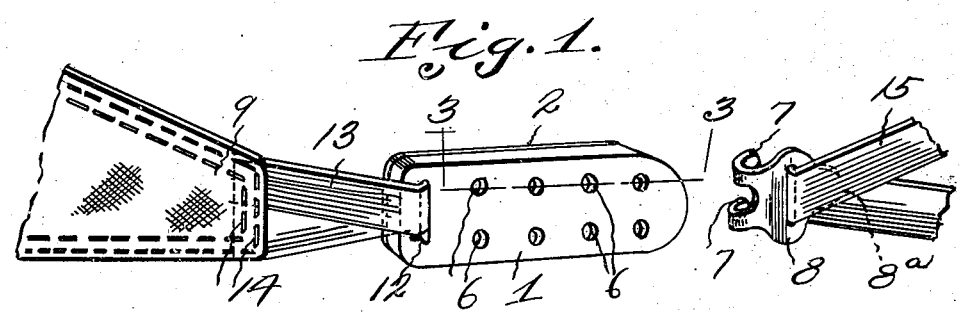
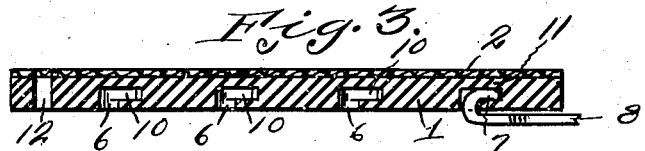
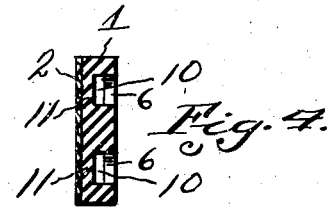
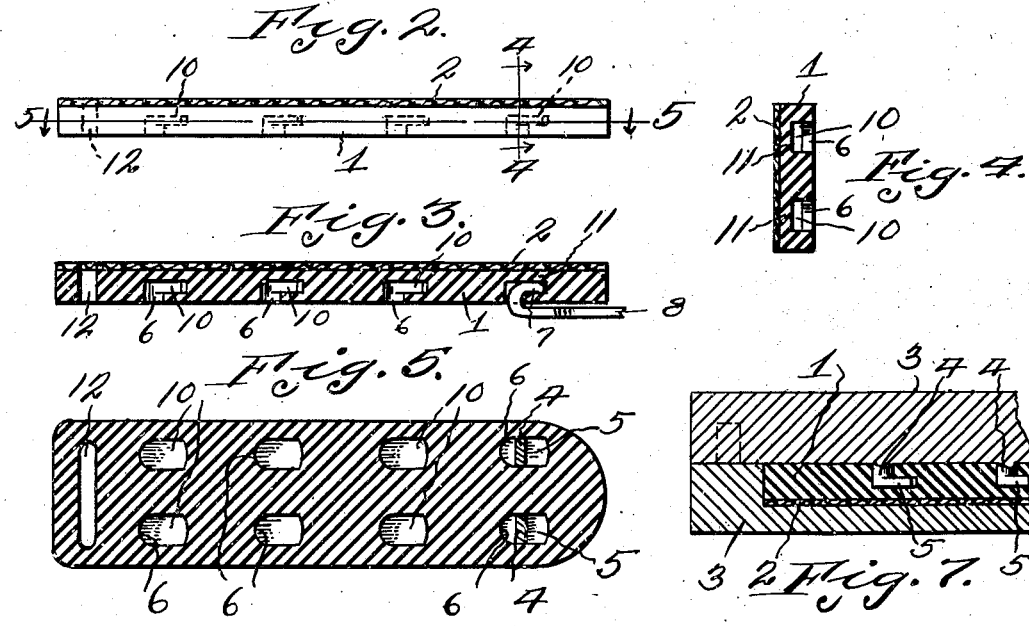
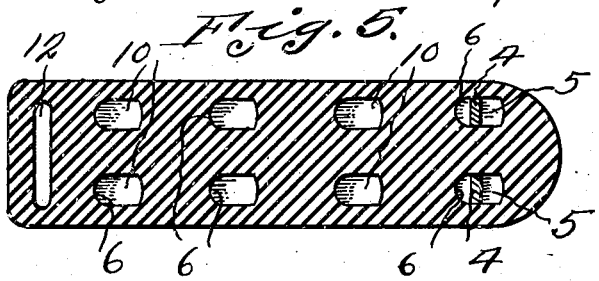
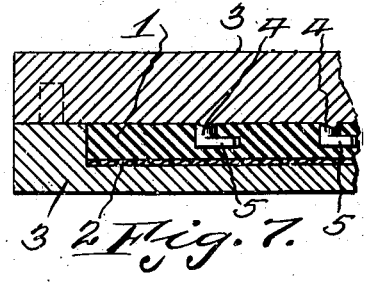
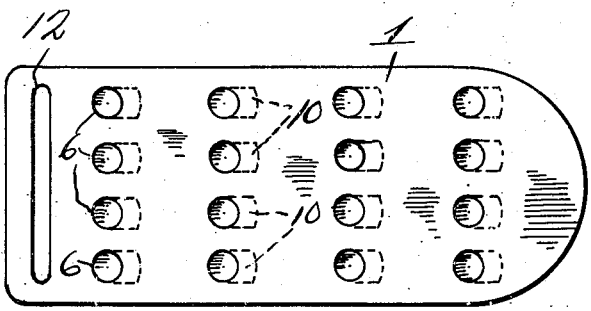
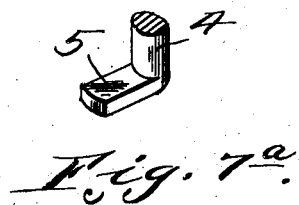
Inventor
Alan J. Fox
By Philip A. H. Serell
Attorney Sept. 27, 1949.  A. J. FOX  2,482,846
GARMENT FASTENER
Filed Oct. 14, 1947 2 Sheets-Sheet 2
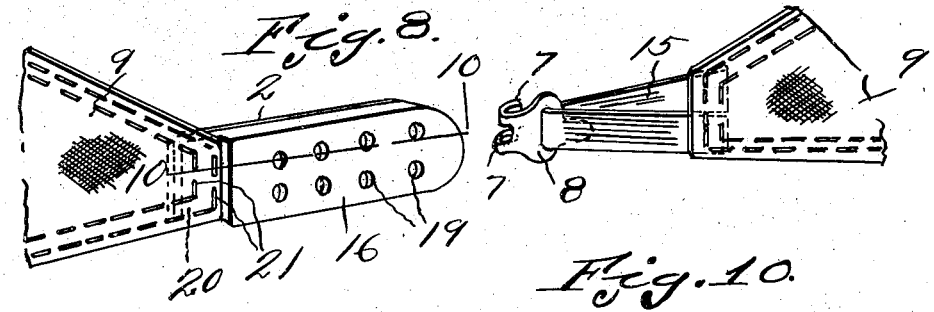
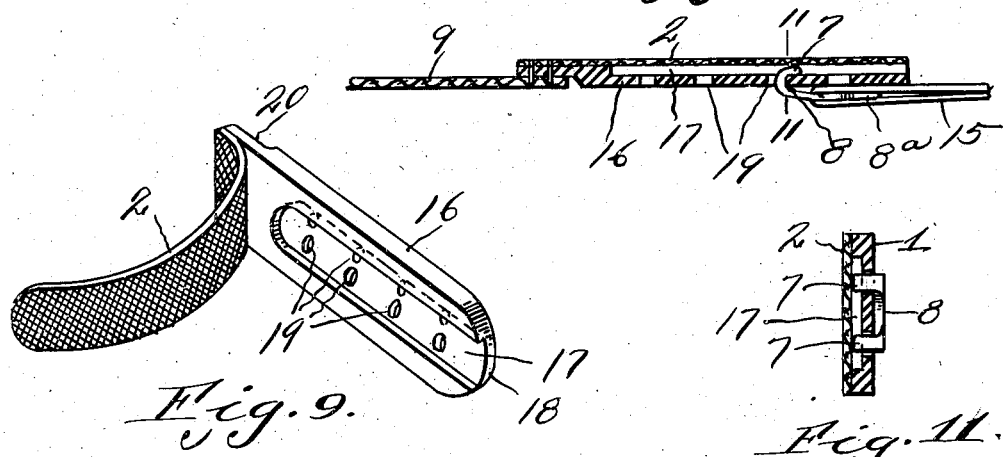
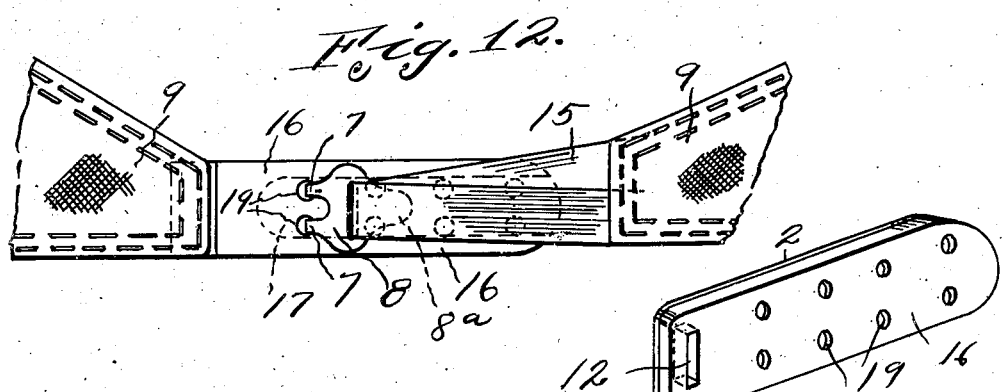
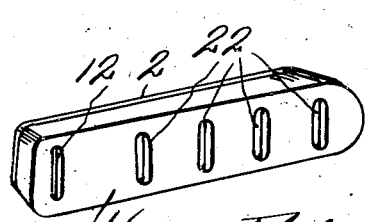
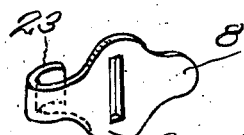
Inventor
Alan J. Fox
By Philip A. Ferrell
Attorney

Patented Sept. 27, 1949

2,482,846

UNITED STATES PATENT OFFICE 2,482,846

GARMENT FASTENER

Alan J. Fox, Miami Beach, Fla.

Application October 14, 1947, Serial No. 779,696

3 Claims. (Cl. 24—206)

The invention relates to garment fasteners, and has for its object to provide a device of this kind, particularly adapted to connect the ends of a brassière, and having an adjustable feature, and at the same time formed in a manner whereby the body of the fastener will maintain its form at all times, thereby obviating the unsightly fasteners at present manufactured which are formed from fabric; the unused ends of which droop and are unsightly, particularly when worn beneath semi-transparent material, or when worn exposed to view in beach attire.

A further object is to provide a brassière fastener which will distribute the strain over the entire ends of the brassière so there is an uplift, and at the same time the ends of the brassière will be maintained flat and against wrinkling.

A further object is to provide a brassière fastener formed from a flexible material, preferably rubber, which will be form maintaining, and constructed in a manner whereby the rubber will not contact the skin of the wearer, and perspiration will not reach the metallic hook forming part of the fastener.

A further object is to provide the body of the fastener with a plurality of fastener hook receiving apertures, which apertures are adapted to receive a hook having a plurality of fingers, thereby increasing the strength of the device, and at the same time allowing freedom of movement of the body from side to side, without a pivotal action of the hook or body in relation to each other.

A further object is to provide the under side of the pliable body with a longitudinally extending channel, into which channel the hooks extend, and the under side with a fabric layer, preferably of bias material which will allow a limited stretching, prevent engagement of the channeled body with the skin of the wearer, and at the same time prevent perspiration from reaching the metallic hook ends in the channel.

With the above and other objects in view the invention resides in the combination and arrangement of parts as hereinafter set forth, shown in the drawings, described and claimed, it being understood that changes in the precise embodiment of the invention may be made without departing from the scope of the invention.

In the drawings:

Figure 1 is a perspective view of the fastener, showing the parts in position to be brought together.

Figure 2 is a top plan view of the fastener body.

Figure 3 is a longitudinal sectional view taken on line 3—3 of Figure 1, showing the hook in position.

Figure 4 is a vertical transverse sectional view through the fastener body, taken on line 4—4 of Figure 2.

Figure 5 is a vertical longitudinal sectional view through the fastener body, taken on line 5—5 of Figure 2.

Figure 6 is a view in elevation of a modified form of fastener body, showing four rows of hook receiving apertures for relatively wide brassière ends, where a plurality of double hooks can be used.

Figure 7 is a sectional view through a mold showing the method of forming the fastener body.

Figure 7a is a perspective view of one of the lugs shown in Figure 7 for forming the hook apertures.

Figure 8 is a perspective view of a modified form of fastener, wherein the end of the fastener body is attached directly to the end of the brassière.

Figure 9 is a rear perspective view of the body, showing the fabric rear layer partially removed to better show the hook receiving channel.

Figure 10 is a horizontal sectional view taken on line 10—10 of Figure 8.

Figure 11 is a vertical transverse sectional view taken on line 11—11 of Figure 10.

Figure 12 is a view in elevation of the fastener, showing the range of adjustability and the position of the parts while in use.

Figure 13 is a perspective view of the fastener body shown in Figure 8, but showing a slot in the end of the body for the reception of a strap to connect the same to a brassière end.

Figure 14 is a perspective view showing a single row of hook receiving apertures, transversely elongated for receiving a wide hook.

Referring to the drawings, the numeral 1 designates the body of the fastener, which body is preferably formed from rubber, however applicant does not limit himself to this material. It has been found, by forming the body 1 of rubber that it will maintain its form at all times, and at the same time will conform to the contour of the body of the user. It has the additional advantage of maintaining its form so the unused end will not hang downwardly out of alinement with the brassière end, upon small adjustments, such as shown in Figure 12, and which is one of the main objections to brassière fasteners formed of fabric, as at present constructed.

Vulcanized, or otherwise secured, to the inner side of the body 1 is a fabric layer 2, which layer is preferably biased in relation to the body 1, as shown in Figure 9, so it will not break away from the body 1 upon the flexing or slight stretching of said body. The fastener body as a whole is preferably formed in a vulcanizing mold between mold sections 3, as shown in Figure 7. It will be seen that the upper mold section 3 is provided with downwardly extending lugs 4, having horizontal arms 5, and these arms form the L-shaped apertures 6 in the body 1, clearly shown in Figure 3.

The L-shaped apertures 6 are preferably in a plurality of rows, as shown in Figure 1, and are adapted to receive the spaced hooks 7 of the fastener member 8. It will be noted that there is a connection at spaced vertical points, consequently the body 1 will be maintained in alinement with the brassière ends 9 at all times, no matter how the body is twisted for varying the contour of the body in different positions. It will be noted that the longitudinally extending branches 10 of the L-shaped apertures 6 are spaced from the inner fabric lining 2 by a rubber wall 11, hence perspiration that may be absorbed in the lining 2 will not reach the hooks 7 and cause them to rust, as is now the common difficulty with fabric connectors, using eyes and staples. Fabric lining 2 keeps the rubber body from engaging the body of the wearer and causing irritation.

One end of the body is provided with a vertical slot 12 extending therethrough for the reception of the elastic connector 13, which is sewed at 14 to the brassière end. Hook member 8 is connected to the other end of the brassière by the elastic connector 15.

Referring to the forms shown in Figures 8 to 12 inclusive, the rear side of the body 16 is provided with a longitudinally extending channel 17, the central portion 18 being provided with hook receiving apertures 19, and in this form of the invention the fabric lining 2 closes the channel 17 and prevents the contact of the hooks 7 with the body of the wearer, and prevents corrosion from perspiration. One end of the body 16 is reduced in thickness at 20 so it can be stitched directly to the brassière end 9, as at 21, hence it will be seen that the brassière end will be held extended at all times, and will assist in the uplift.

In some brassières the ends are relatively wide and involve the use of a wide connector, as shown in Figure 6, and in which figure provision is made for the reception of two double hooks, otherwise the construction and operation is the same.

Figure 13 shows the same construction, except that the end of the body is provided with a vertically elongated slot 12, similar to the slot 12 in Figure 5 for the reception of the connecting strap 13.

Referring to Figure 14, the construction and operation is the same as in Figures 8 to 13, except the body is provided with a plurality of elongated alined apertures 22 for the reception of a relatively wide hook 23, which gives a wide bearing for preventing pivotal action between the fastener parts.

From the above it will be seen that a brassière fastener is provided which will obviate the unsightly appearance of brassière fasteners as at present constructed; will obviate the cost of stitching of fabric connectors, having eyes and staples which easily tear out of the strip and stretch to a stringy appearance.

The device can be made in various colors, according to the color of the brassière. To facilitate the handling of the hook 8 during the connecting operation, the inner end of the hook is provided with an extension 8a, which may be grasped between the fingers.

The invention having been set forth what is claimed as new and useful is:

1. The combination with brassière ends, of a fastener therefor, said fastener comprising a body member formed from a single piece of semi-rigid form retaining material and connected to one of the brassière ends, a connecting member carried by the other brassière end and adapted to interengage with the body member entirely within the lines of the body member, a lining carried by said body member on its inner side, a plurality of fastener receiving L-shaped apertures in the body member, said connecting member comprising a plurality of L-shaped members adapted to be received in the apertures and terminating spaced from the inner and outer sides of the body member.

2. A device as set forth in claim 1 wherein the body member is provided with a plurality of L-shaped hook receiving apertures extending inwardly and longitudinally towards the outer end of the body member.

3. A device as set forth in claim 1 wherein the body member is provided with a plurality of rows of apertures for the reception of the fastening means, said apertures extending transversely inwardly and longitudinally towards the free end of the body member in spaced relation to the inner and outer faces of the body member.

ALAN J. FOX.

REFERENCES CITED

The following references are of record in the file of this patent:

UNITED STATES PATENTS

| Number | Name | Date |
|---|---|---|
| 1,565,202 | Reiter | Dec. 8, 1925 |
| 2,054,840 | Statham | Sept. 22, 1936 |
| 2,134,304 | Jones | Oct. 25, 1938 |
| 2,138,542 | Goldberg | Nov. 29, 1938 |
| 2,312,775 | Rabinowitz | Mar. 2, 1943 |
| 2,370,754 | Roseman | Mar. 6, 1945 |